US011906249B2

(12) United States Patent
Wiedenhoefer

(10) Patent No.: US 11,906,249 B2
(45) Date of Patent: *Feb. 20, 2024

(54) TUBE BANK HEAT EXCHANGER

(71) Applicant: RTX Corporation, Farmington, CT (US)

(72) Inventor: James F. Wiedenhoefer, Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,953

(22) Filed: Aug. 9, 2022

(65) Prior Publication Data

US 2023/0141836 A1    May 11, 2023

Related U.S. Application Data

(63) Continuation of application No. 17/078,720, filed on Oct. 23, 2020, now Pat. No. 11,454,451.

(51) Int. Cl.
*F28F 9/02* (2006.01)
*F28D 7/16* (2006.01)

(52) U.S. Cl.
CPC .................. *F28D 7/163* (2013.01)

(58) Field of Classification Search
CPC ...................................... F28D 7/163
USPC ........................................ 165/173
See application file for complete search history.

(56) References Cited

U.S. PATENT DOCUMENTS

| | | | |
|---|---|---|---|
| 4,923,004 A | 5/1990 | Fletcher et al. | |
| 5,469,915 A | 11/1995 | Cesaroni | |
| 6,964,297 B1 * | 11/2005 | Janezich | F28F 9/14 |
| | | | 285/19 |
| 7,549,465 B2 | 6/2009 | Gong et al. | |
| 8,418,365 B2 | 4/2013 | German et al. | |
| 10,184,400 B2 | 1/2019 | Cerny et al. | |
| 2001/0018969 A1 | 9/2001 | Shin et al. | |
| 2012/0211158 A1 | 8/2012 | Becnel et al. | |
| 2014/0231055 A1 | 8/2014 | Schalansky | |

(Continued)

FOREIGN PATENT DOCUMENTS

| | | |
|---|---|---|
| CN | 2020131330 U * | 10/2011 |
| EP | 2998681 A1 | 3/2016 |

(Continued)

OTHER PUBLICATIONS

European Search Report dated Mar. 1, 2022 for European Patent Application No. 212023477.

(Continued)

*Primary Examiner* — Davis D Hwu
(74) *Attorney, Agent, or Firm* — Bachman & LaPointe, P.C.

(57) ABSTRACT

A heat exchanger has: a first manifold assembly having a stack of plates; a second manifold assembly having a stack of plates; and a plurality of tubes extending from the first manifold assembly to the second manifold assembly. The plurality of tubes is a plurality groups of tubes. For each of the groups of the tubes: the tubes of the group have first ends mounted between plates of the first manifold assembly; and the tubes of the group have second ends mounted between plates of the second manifold assembly.

21 Claims, 15 Drawing Sheets

(56) References Cited

U.S. PATENT DOCUMENTS

| | | |
|---|---|---|
| 2015/0101334 A1 | 4/2015 | Bond et al. |
| 2015/0233588 A1 | 8/2015 | Betts et al. |
| 2015/0260464 A1 | 9/2015 | Cole et al. |
| 2019/0170445 A1 | 6/2019 | McCaffrey |
| 2019/0170455 A1 | 6/2019 | McCaffrey |
| 2019/0212074 A1 | 7/2019 | Lockwood et al. |

FOREIGN PATENT DOCUMENTS

| | | |
|---|---|---|
| FR | 3026164 A1 * | 3/2016 |
| WO | 2007/049438 A1 | 5/2007 |

OTHER PUBLICATIONS

U.S. Office Action dated Feb. 3, 2022 for U.S. Appl. No. 17/078,720.
U.S. Office Action dated Mar. 23, 2022 for U.S. Appl. No. 17/078,720.

* cited by examiner

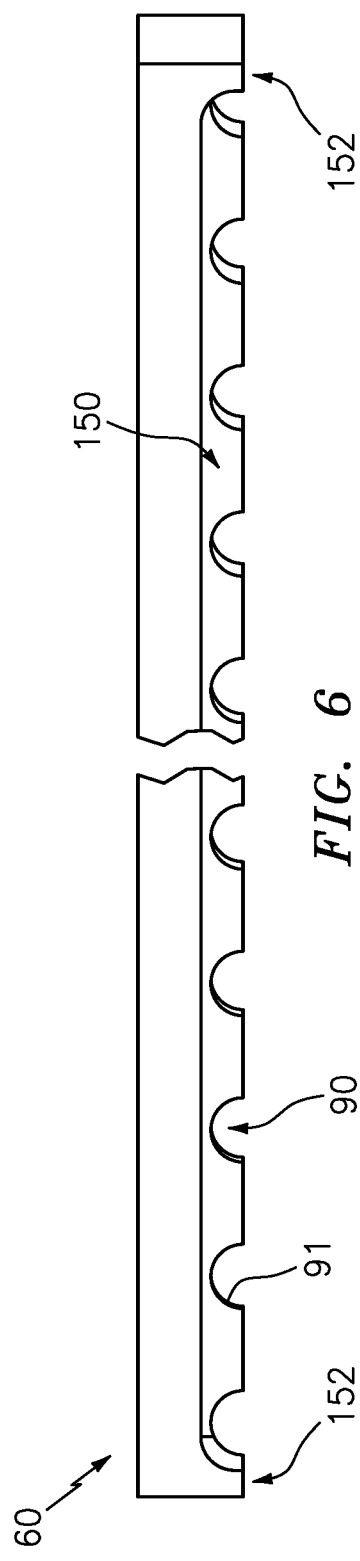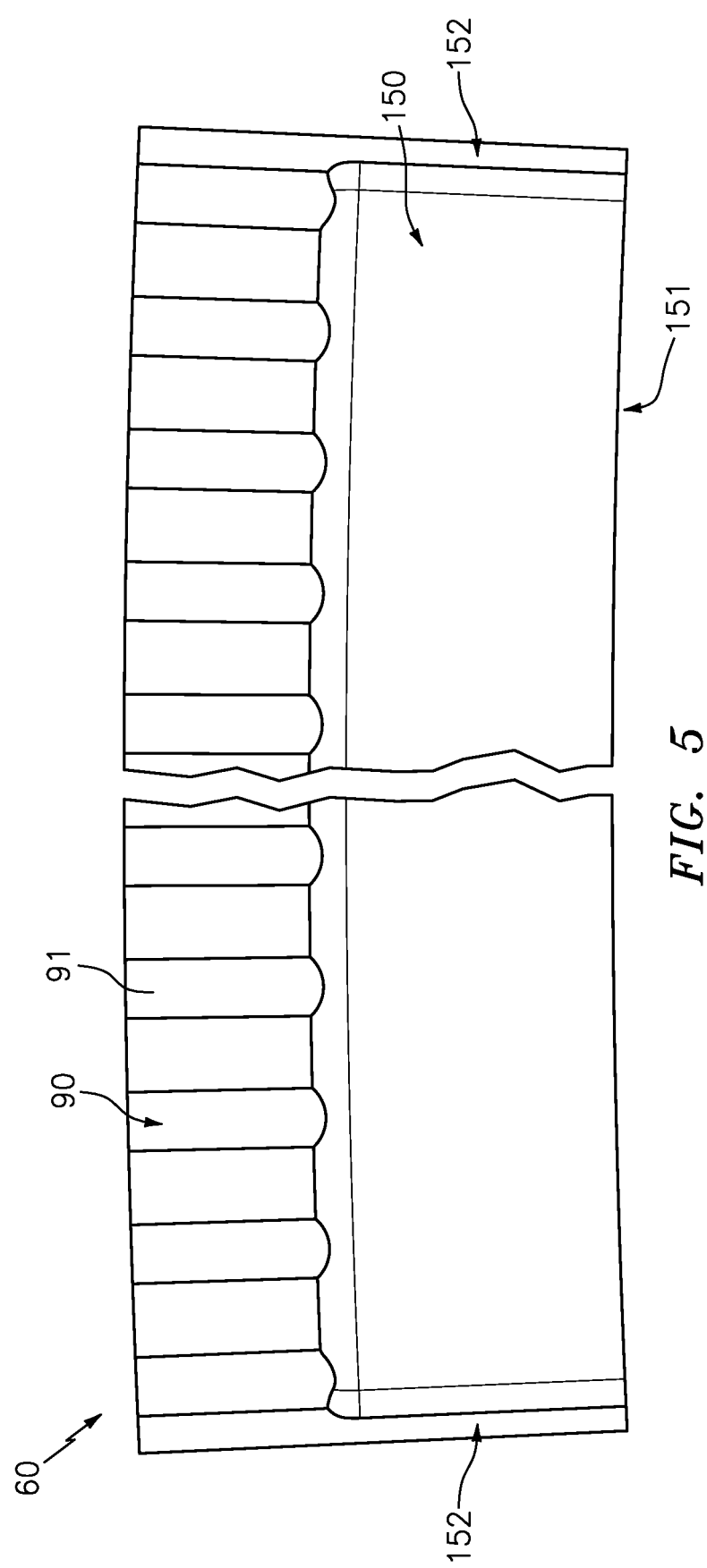

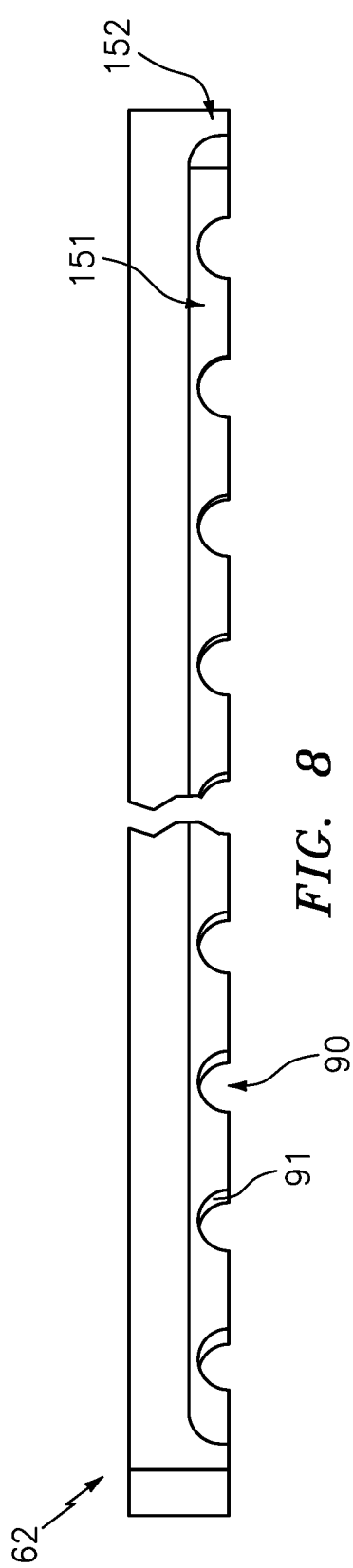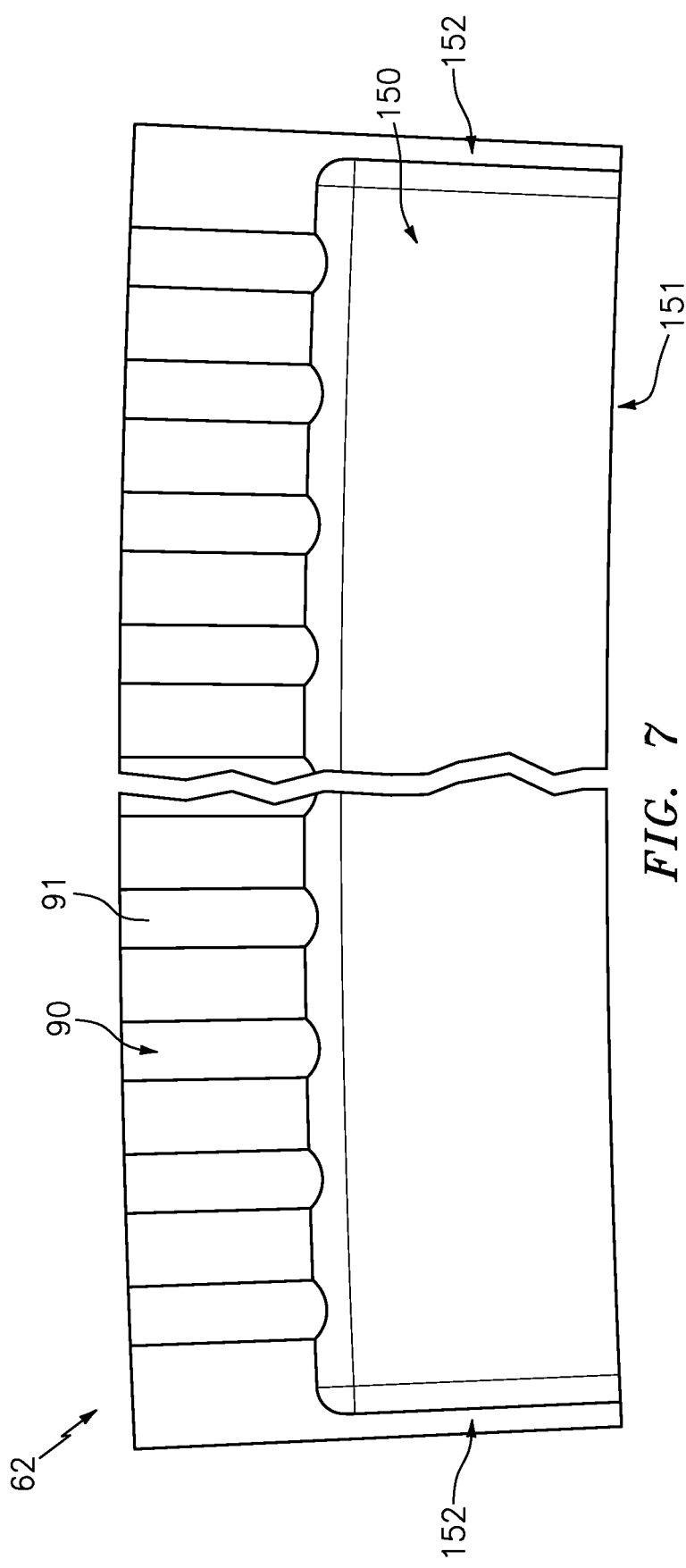

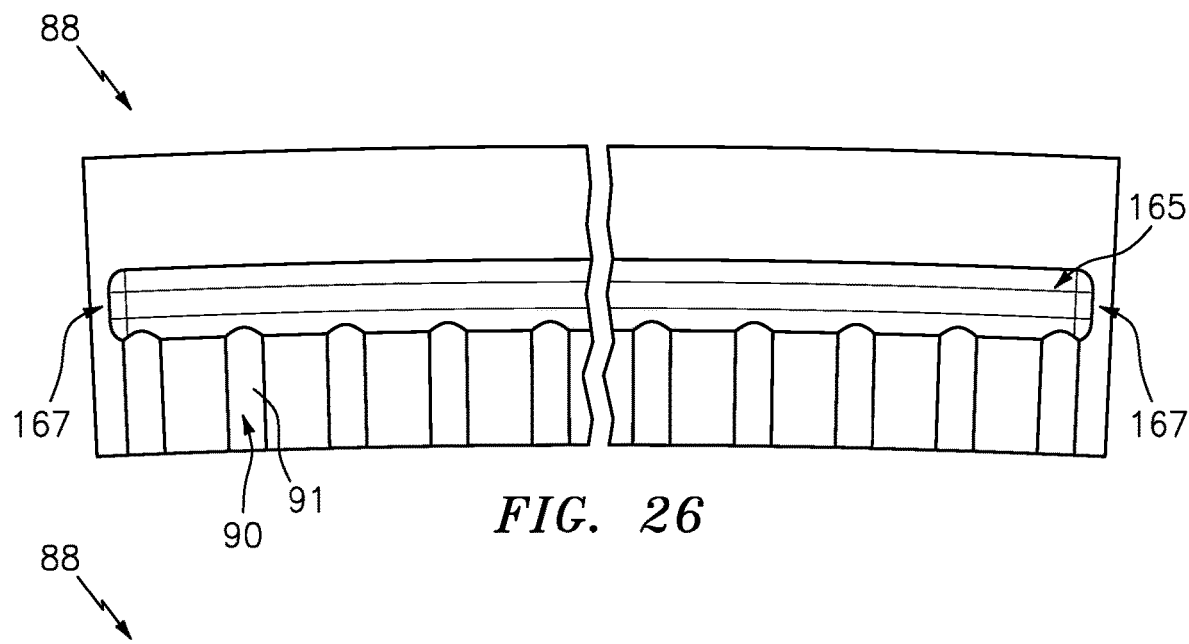
FIG. 26
FIG. 28
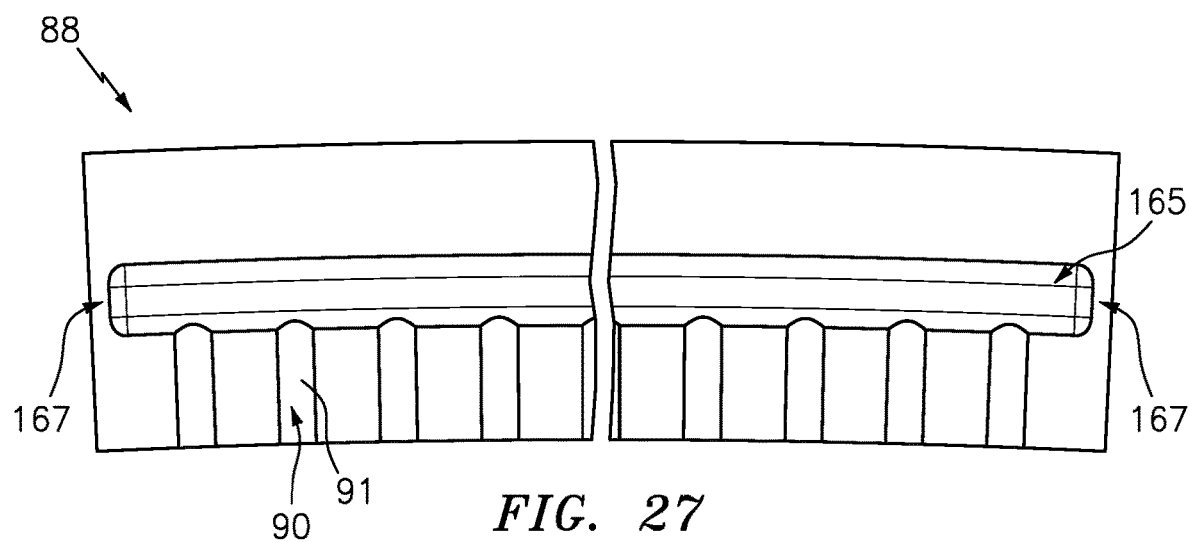
FIG. 27

TUBE BANK HEAT EXCHANGER

CROSS-REFERENCE TO RELATED APPLICATION

This is a continuation of U.S. patent application Ser. No. 17/078,720, filed Oct. 23, 2020, and entitled "Tube Bank Heat Exchanger".

BACKGROUND

The disclosure relates to gas turbine engines. More particularly, the disclosure relates to gas turbine engine heat exchangers.

Gas turbine engines (used in propulsion and power applications and broadly inclusive of turbojets, turboprops, turbofans, turboshafts, industrial gas turbines, and the like) include a variety of heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer heat from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

Among recently proposed annular heat exchangers are those in United States Patent Application Publication 20150101334A1 (the '334 publication), Bond et al., Apr. 16, 2015, "HEAT EXCHANGERS" and U.S. Pat. No. 10,184,400 (the '400 patent), Cerny et al., Jan. 22, 2019, "Methods of cooling a fluid using an annular heat exchanger".

SUMMARY

One aspect of the disclosure involves a heat exchanger comprising: a first manifold assembly comprising a stack of plates; a second manifold assembly comprising a stack of plates; and a plurality of tubes extending from the first manifold assembly to the second manifold assembly. The plurality of tubes comprises a plurality of groups of tubes. For each of the groups of the tubes: the tubes of the group have first ends mounted between plates of the first manifold assembly; and the tubes of the group have second ends mounted between plates of the second manifold assembly.

In a further embodiment of any of the foregoing embodiments, additionally and/or alternatively, the plurality of groups form a respective plurality of stages of tubes, with the tubes of each group being fluidically in parallel with each other and the tubes of the different groups being fluidically in series.

In a further embodiment of any of the foregoing embodiments, additionally and/or alternatively, adjacent plates of the first manifold assembly combine to form associated plenums common to the tubes of the associated group of tubes and adjacent plates of the second manifold assembly combine to form associated plenums common to the tubes of the associated group of tubes.

In a further embodiment of any of the foregoing embodiments, additionally and/or alternatively, the first manifold assembly is an inner manifold assembly and the second manifold assembly is an outer manifold assembly at least partially surrounding the inner manifold assembly so that the tubes of each group diverge from each other from the first manifold assembly to the second manifold assembly.

In a further embodiment of any of the foregoing embodiments, additionally and/or alternatively, the groups form respective rows of tubes and the heat exchanger has at least 3 said rows of tubes.

In a further embodiment of any of the foregoing embodiments, additionally and/or alternatively, the groups form respective rows of tubes and the heat exchanger has at least 20 tubes in each of the rows.

In a further embodiment of any of the foregoing embodiments, additionally and/or alternatively, the tubes each have a plurality of bends.

In a further embodiment of any of the foregoing embodiments, additionally and/or alternatively, the tubes' plurality of bends each have a respective bend axis transverse to a stacking direction of the first manifold assembly and second manifold assembly.

In a further embodiment of any of the foregoing embodiments, additionally and/or alternatively, the tubes' at least one bend is, for each tube, a first bend and a second bend; and between the first bend and the second bend, each tube has a continuous arc of at least 50% of a length of said tube.

In a further embodiment of any of the foregoing embodiments, additionally and/or alternatively, in at least one of the first manifold assembly and the second manifold assembly: the stack of plates comprises a first end plate, a second end plate, and a plurality of intermediate plates; and the plurality of intermediate plates are a plurality of first intermediate plates identical to each other and one or more second intermediate plates identical to each other if a plurality but different from the first intermediate plates and alternating with the first intermediate plates.

In a further embodiment of any of the foregoing embodiments, additionally and/or alternatively, in the first manifold assembly: the stack of plates comprises a first end plate, a second end plate, and a plurality of intermediate plates; and the plurality of intermediate plates are an alternating plurality of first intermediate plates identical to each other and second intermediate plates identical to each other but different from the first intermediate plates; and in the second manifold assembly: the stack of plates comprises a first end plate, a second end plate, and a plurality of intermediate plates; and the plurality of intermediate plates are an alternating plurality of first intermediate plates identical to each other and second intermediate plates identical to each other but different from the first intermediate plates.

In a further embodiment of any of the foregoing embodiments, additionally and/or alternatively, in the first manifold assembly: the first intermediate plates have a first face with a first channel, a second face with a second channel, and no through-holes between the first channel and second channel; and the second intermediate plates have a first face with a first channel, a second face with a second channel, and a plurality of through-holes between the first channel and second channel. In the second manifold assembly: the first intermediate plates have a first face with a first channel, a second face with a second channel, and a plurality of through-holes between the first channel and second channel; and the second intermediate plates have a first face with a first channel, a second face with a second channel, and no through-holes between the first channel and second channel.

In a further embodiment of any of the foregoing embodiments, additionally and/or alternatively, the manifold plates and tubes each comprise Ni-based superalloy or stainless steel.

In a further embodiment of any of the foregoing embodiments, additionally and/or alternatively, a turbine engine includes the heat exchanger and further comprises a gas path (e.g., a core flowpath or a bypass flowpath) passing gas across exteriors of the plurality of tubes.

In a further embodiment of any of the foregoing embodiments, additionally and/or alternatively: the tubes each have a first bend and a second bend; and between the first bend and the second bend, each tube has a portion of at least 50% of a length of said tube.

In a further embodiment of any of the foregoing embodiments, additionally and/or alternatively, the first bend and second bend shift said portion downstream along the gas path.

A further embodiment of any of the foregoing embodiments may additionally and/or alternatively include the turbine engine further comprising a recuperator comprising: a turbine coupled to the at least one outlet of the outlet manifold; and a compressor having an outlet coupled to the at least one inlet of the inlet manifold.

A further embodiment of any of the foregoing embodiments may additionally and/or alternatively include the recuperator comprising a generator driven by the turbine.

A further embodiment of any of the foregoing embodiments may additionally and/or alternatively include the recuperator comprising a supercritical carbon dioxide or other cryogenic working fluid.

In a further embodiment of any of the foregoing embodiments, additionally and/or alternatively, a method for using the heat exchanger comprises: passing a first fluid flow along a first flowpath across exteriors of the tubes; and passing a second fluid flow through interiors of the tubes. The tubes each have at least one bend. The at least one bend shifts a portion of the tube downstream along the first flowpath. The passing of the first flow and the second flow thermally expands the length of the tubes to further shift the portion downstream along the first flowpath.

Another aspect of the disclosure involves a method for manufacturing a heat exchanger. The heat exchanger comprises: a first manifold assembly comprising a stack of plates; a second manifold assembly comprising a stack of plates; and a plurality of tubes extending from the first manifold assembly to the second manifold assembly. The plurality of tubes comprises a plurality of groups of tubes. For each of the groups of the tubes: the tubes of the group have first ends mounted between plates of the first manifold assembly; and the tubes of the group have second ends mounted between plates of the second manifold assembly. The method comprises: stacking the respective plates of the first manifold assembly and the second manifold assembly with the respective first and second ends of the tubes between the associated plates; applying compression across the first manifold assembly's plates while applying an electrical current across the first manifold assembly's plates so as to bond the first manifold assembly's plates to each other; and applying compression across the second manifold assembly's plates while applying an electrical current across the second manifold assembly's plates so as to bond the second manifold assembly's plates to each other.

In a further embodiment of any of the foregoing embodiments, additionally and/or alternatively, the method further comprises thermally heating during the applying compression across the first manifold assembly's plates and the second manifold assembly's plates.

In a further embodiment of any of the foregoing embodiments, additionally and/or alternatively, the first manifold assembly's plates and the second manifold assembly's plates are alloy plates.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is an inboard end view of a first end plate of an inner diameter (ID) manifold of the heat exchanger.

FIG. 6 is an off-center inner diameter (ID) view of the plate of FIG. 5.

FIG. 7 is an inboard end view of a second end plate of the ID manifold.

FIG. 8 is an off-center ID view of the plate of FIG. 7.

FIG. 26 is a first end view of a boundary plate in the OD manifold.

FIG. 27 is a second end view of the plate of FIG. 26.

FIG. 28 is an off-center ID view of the plate of FIG. 26.

Like reference numbers and designations in the various drawings indicate like elements.

DETAILED DESCRIPTION

Figure 1:
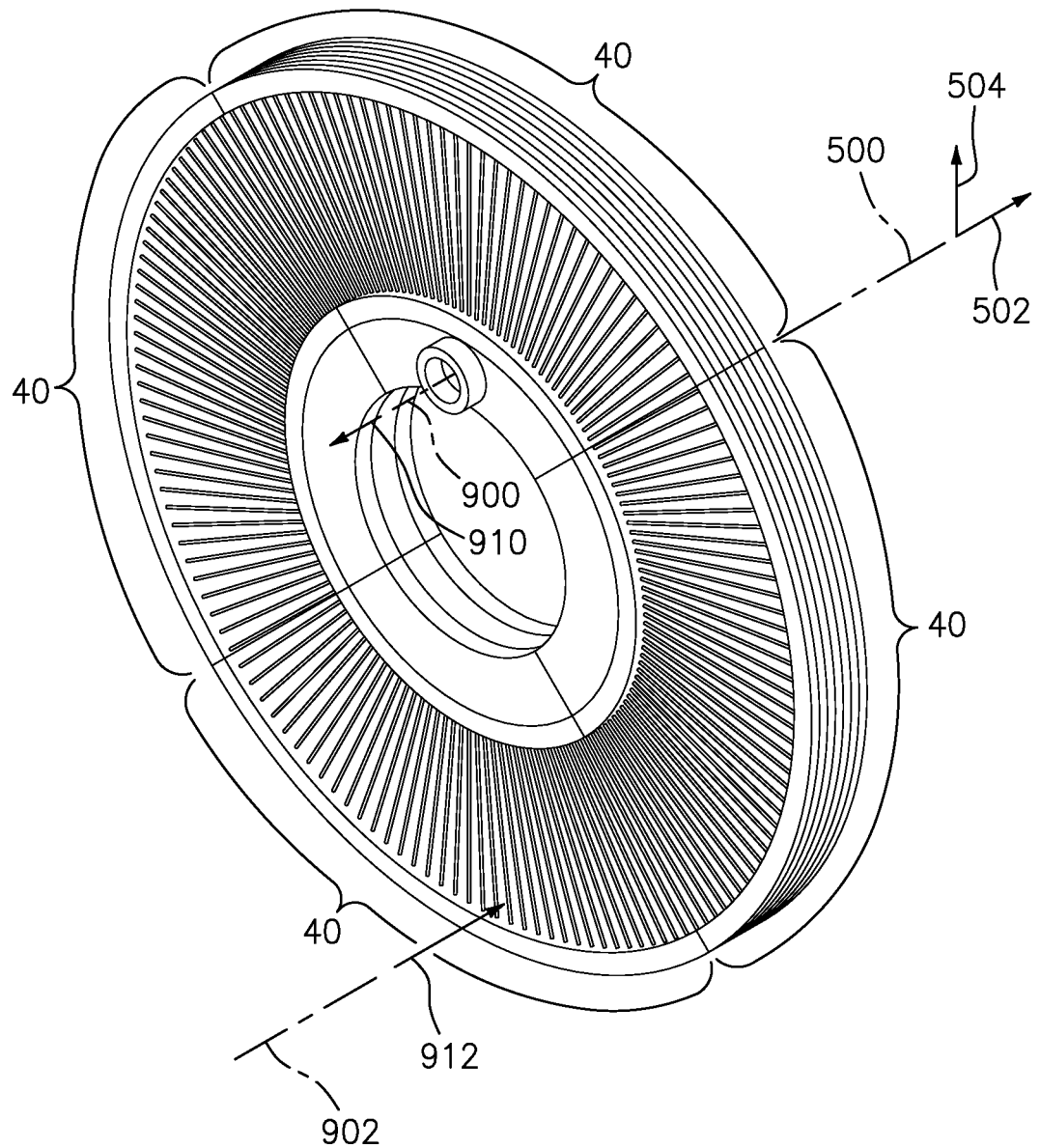
FIG. 1 is a view of a circumferentially segmented annular heat exchanger.

FIG. 1 shows a heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters and exits the heat exchanger 20 as a single piped flow and the flow 912 is an axial annular flow surrounding a central longitudinal axis 500 of the heat exchanger. FIG. 1 also shows an axial direction 502 as a generally downstream direction along the first flowpath 100. In a coaxial duct within a gas turbine engine, the axis 500 may be coincident with a centerline of the engine and an axis of rotation of its spools, the direction 502 is an aftward/rearward direction, and a radial direction is shown as 504.

Figure 3:
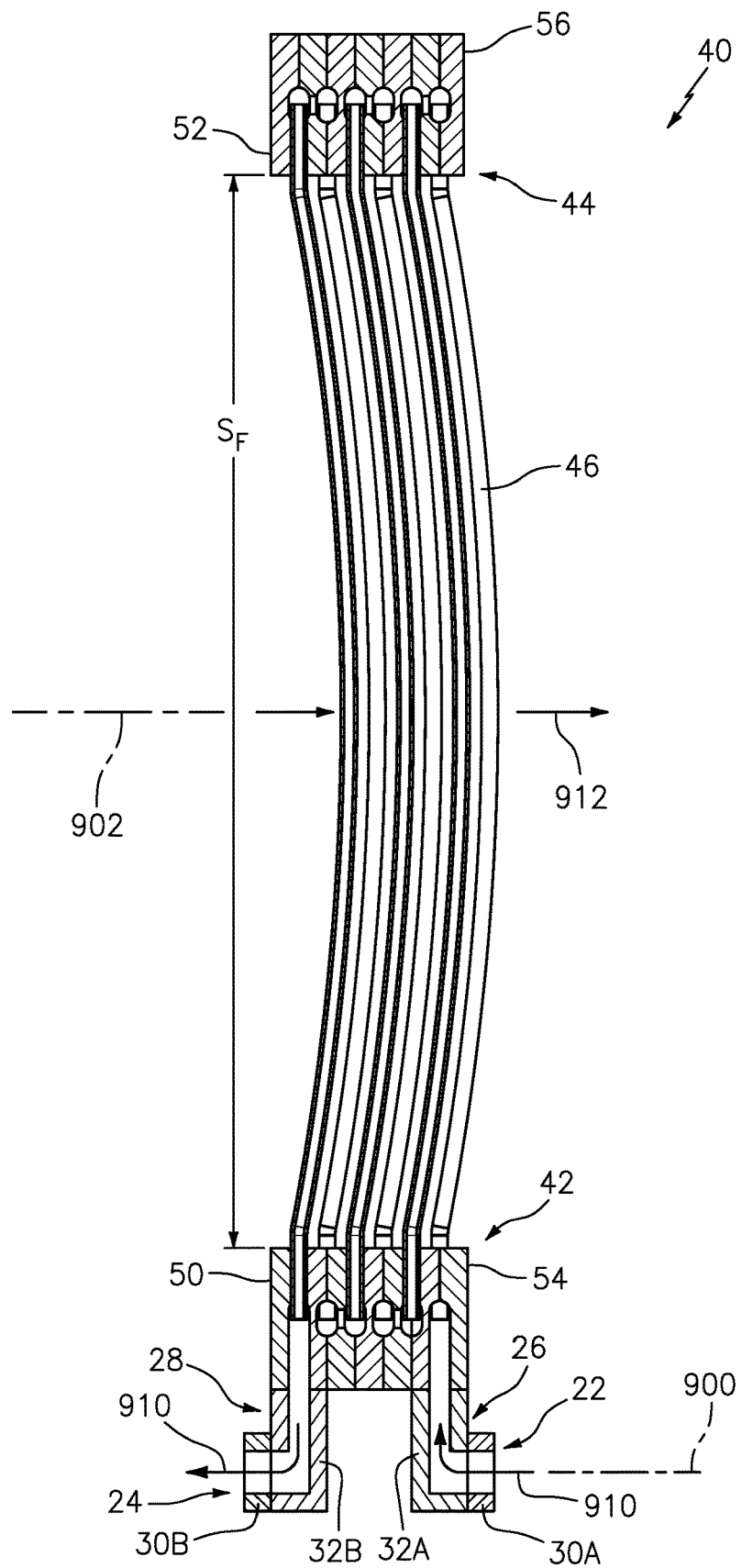
FIG. 3 is a partial axial/radial sectional view of the heat exchanger.

The heat exchanger 20 has a first flow inlet 22 (FIG. 3) and a first flow outlet 24. The exemplary inlet and outlet are, respectively, ports of an inlet manifold 26 and an outlet manifold 28. Exemplary manifolds are metallic (e.g., nickel-based superalloy). The inlet manifold and outlet manifold may each have a respective fitting 30A, 30B providing the associated port 22, 24. Each manifold 26, 28 further has a body 32A, 32B extending circumferentially about the axis 500 from the associated fitting 30A, 30B, and port 22, 24. The exemplary manifolds have continuously curving arcuate form.

The exemplary heat exchanger 20 is circumferentially segmented into a plurality of segments 40 (four segments shown in FIG. 1). Each segment 40 may, itself, be identified as a heat exchanger. Depending upon situation, the segments 40 may be plumbed to have respective first flow segments in parallel, in series, or two totally different first flows. In the illustrated example, they are plumbed in parallel with each other along both flowpaths 900 and 902. As is discussed further below, each segment 40, itself, has a first manifold 42, a second manifold 44, and a plurality of heat transfer tubes 46 extending between the first manifold and the second manifold. Interiors of the tubes fall along the associated branch of the first flowpath to pass an associated portion of the first flow. Central exposed exterior surfaces of the tubes are along the second flowpath in heat exchange relation with the second flow.

The manifolds 42 and 44 of the individual segments may be mated to the overall heat exchanger manifolds 26 and 28 (if separately-formed). In the exemplary implementation, the segment first manifold 42 is a combined inlet and outlet manifold separately in fluid communication with the overall heat exchanger manifolds 26, 28. They may be mated/sealed by welding, brazing, or gasketed bolting. The segment second manifold 44 is thus a turn manifold lacking external fluid communications.

In alternative embodiments (not shown), one of the segment manifolds 42, 44 may be an inlet manifold mated to (or otherwise integrated with) the heat exchanger manifold 26 while the other is an outlet manifold mated to (or otherwise integrated with) the heat exchanger manifold 28.

As is discussed further below, each of the manifolds 42, 44 is formed as an assembly of a stack of plates (FIGS. 3 & 4) extending between a first axial end 50, 52 and a second axial end 54, 56, respectively. Each of the plates has a pair of opposite faces (axially-facing or radially/circumferentially extending), a pair of circumferential ends, an inner diameter (ID) surface, and an outer diameter (OD) surface. In the exemplary embodiment, the plates of each manifold 42, 44 are stacked with the aft/downstream face of one plate contacting and secured to the forward/upstream face of the next. From upstream-to-downstream along the second flowpath 902 or fore-to-aft in the axial direction 502, the end sections or portions of groups of the tubes 46 are mounted in pockets 58 (FIG. 4) formed between the mating plates. As is discussed further below, the tubes of each group are staggered to relative to the adjacent row(s) provide out-of-phase registry with the tubes of the adjacent groups fore or aft (e.g., each tube of a given row is circumferentially directly between two adjacent tubes of each of the two adjacent rows—except at circumferential or axial ends).

Figure 4:
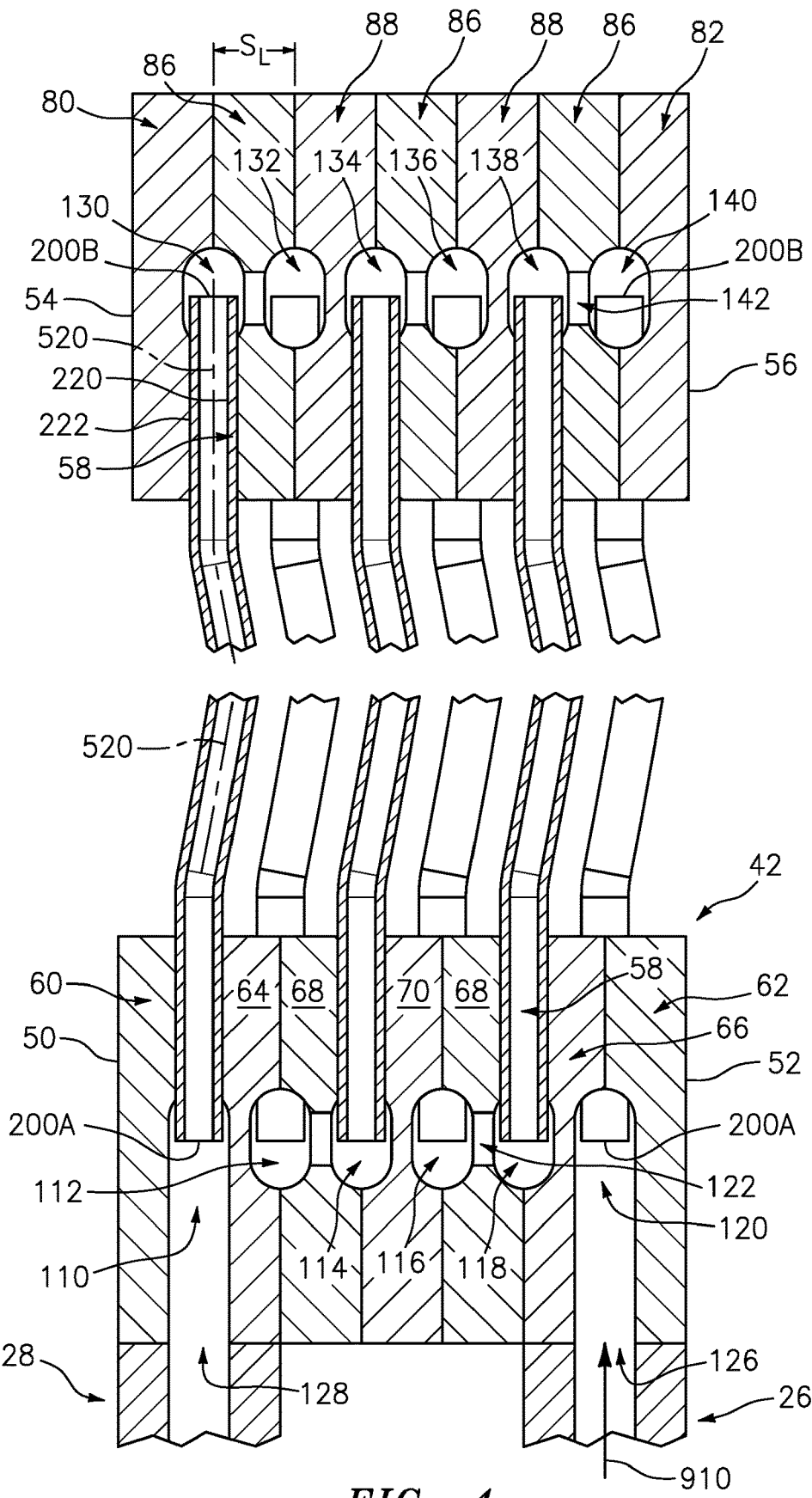
FIG. 4 is an enlarged cutaway axial/radial sectional view of the heat exchanger.
Figure 9:
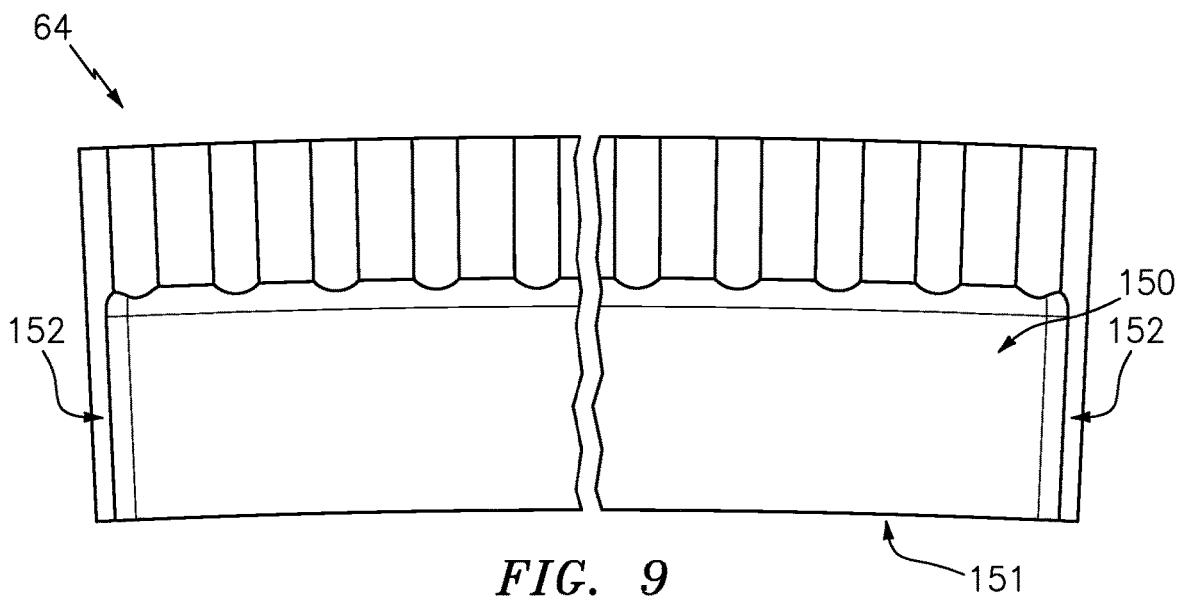
FIG. 9 is an outboard end view of a first penultimate plate in the ID manifold.
Figure 11:
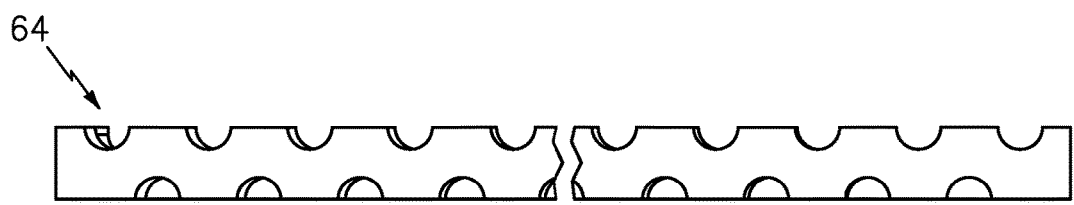
FIG. 11 is an off-center outer diameter (OD) view of the plate of FIG. 9.

FIG. 4 shows pockets 58 at the plate junctions accommodating the tube end sections. With exemplary circular-section tubing, the pockets are essentially right circular cylindrical pockets split evenly between the two plates and provided by respective semi-cylindrical grooves 90 (FIG. 5) in the two faces. The grooves (or pocket segments/sections) 90 have surfaces 91 and extend between the associated OD surface of an ID plate or ID surface of an OD plate on the one hand and a plenum discussed below on the other hand.

With the exemplary arcuate manifold segment configuration, the first manifold assembly 42 is an inner (inner diameter (ID)) manifold and the second manifold assembly 44 is an outer (outer diameter (OD)) manifold assembly at least partially surrounding the first manifold assembly so that tubes 46 in each group circumferentially diverge from each other in the radial direction from the first manifold assembly to the second manifold assembly. Despite this radial fanning arrangement, each group may be identified as a "row" as is common practice with tube-bank heat exchangers.

The plates of the first manifold assembly 42 include a first end plate 60, a second end plate 62, and one or more intermediate plates. Depending on implementation, the intermediate plates may be the same as each other or different from each other. In the illustrated example, the first manifold intermediate plates are: first and second penultimate plates 64 and 66 respectively adjacent the first and second plates 60 and 62; and alternating first intermediate plate(s) 68 and second intermediate plate(s) 70.

In the illustrated example: the various plates are symmetrical from one of their circumferential ends to the other (e.g., across a central axial/radial plane); and the rows thus alternate in number of tubes by a single tube with even rows having one number of tubes and odd rows differing by one. An exemplary number of rows is at least two or at least three. Upper limits may be influenced by diminishing return on heat transfer and by increasing fluidic losses along both flowpaths. Thus, an exemplary upper limit on rows is ten with a likely sweet spot of three to six rows. For full annular heat exchangers there may be a thousand or more tubes per row. Even for a smaller segment, there may be hundreds of tubes per row or more. There may be at least an exemplary twenty in a segment (whether stand-alone or assembled with other segments such as sectors discussed above) or a range of twenty to one thousand or twenty to two hundred).

Alternatively: the end plates 60 and 62 may be identical to each other but oppositely facing; and the penultimate plates 64 and 66 may be identical to each other. Circumferential end-to-end asymmetry of the alternative plates may allow the first circumferential ends of the plates to align with each other and the second circumferential ends of the plates to align with each other. This would allow staggered groups of the same number of tubes (in distinction to the illustrated difference of one tube between the two alternating sets of rows). In other implementations, this alignment may be lacking (e.g., the plate ends at a given circumferential end of the ID manifold stagger). This stagger potentially allows mechanical interfitting between circumferential ends of adjacent manifolds. This, in some implementations, may allow full annulus manifolds to be assembled from circumferential segments. In other full annulus manifold situations, the plates are full annulus.

In yet further variations, the overall heat exchanger manifolds 26 and 28 may be more extensively integrated with the segment manifolds 42 and 44. For example, an end plate and a penultimate plate may combine to also form the associated overall heat exchanger manifold 22 or 28 or a segment thereof. In yet other variations, one or both of the overall manifolds may be integrated with the second manifold assembly 44.

Similarly, the plates of the second manifold assembly 44 include a first end plate 80, a second end plate 82, and one or more intermediate plates. Depending on implementation, the intermediate plates may be the same as each other or different from each other. In the illustrated example, the second manifold intermediate plates are alternating first intermediate plates 86 and second intermediate plates 88. The possibilities for end-to-end circumferential symmetry or asymmetry and the implications thereof are the same as those discussed for the first manifold assembly 42.

Figure 10:
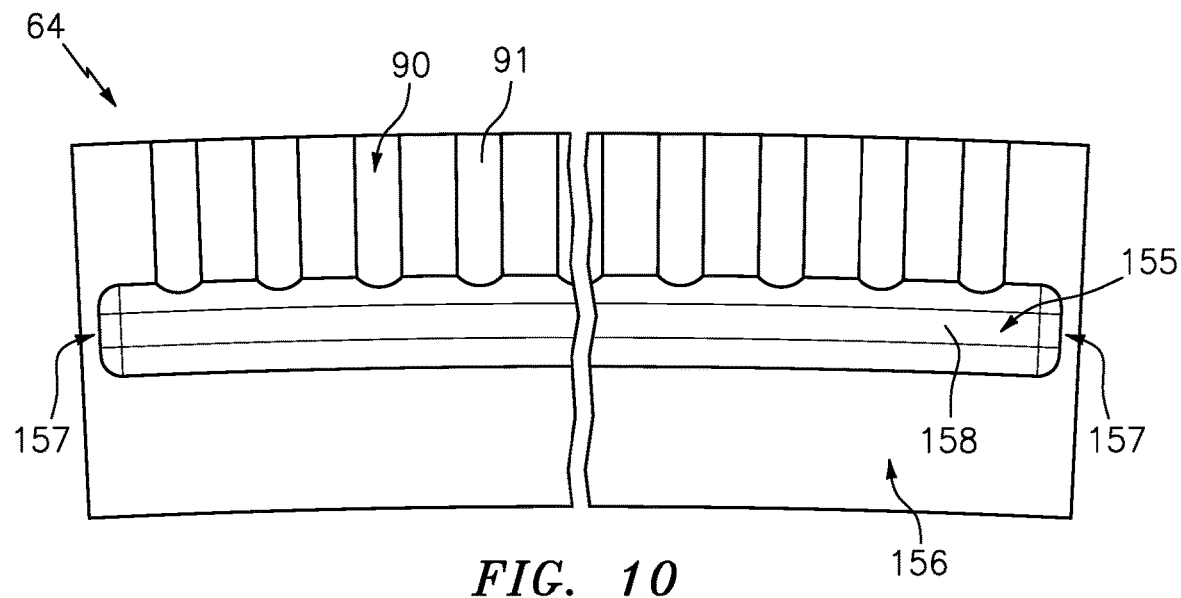
FIG. 10 is an inboard end view of the plate of FIG. 9.
Figure 12:
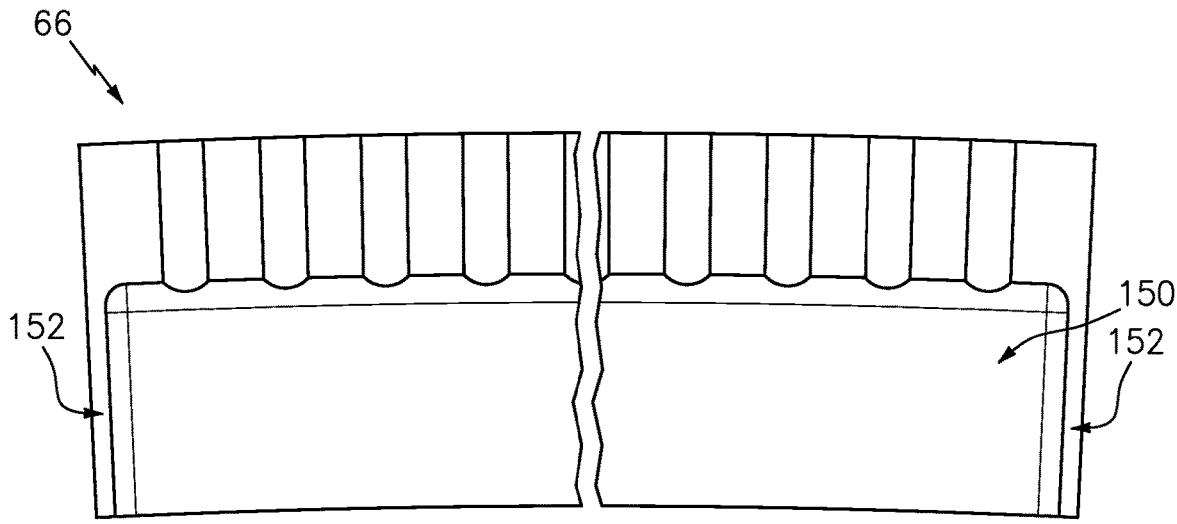
FIG. 12 is outboard end view of a second penultimate plate in the ID manifold.
Figure 14:
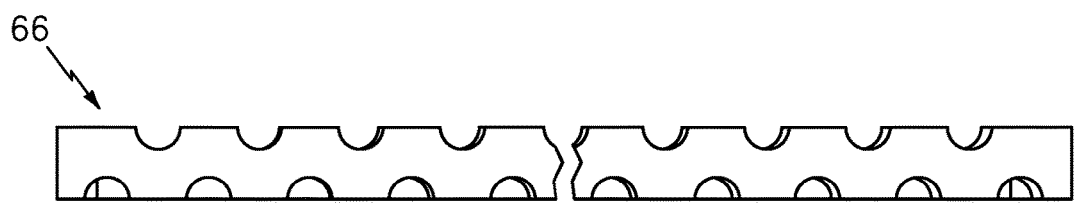
FIG. 14 is an off-center OD view of the plate of FIG. 12.
Figure 13:
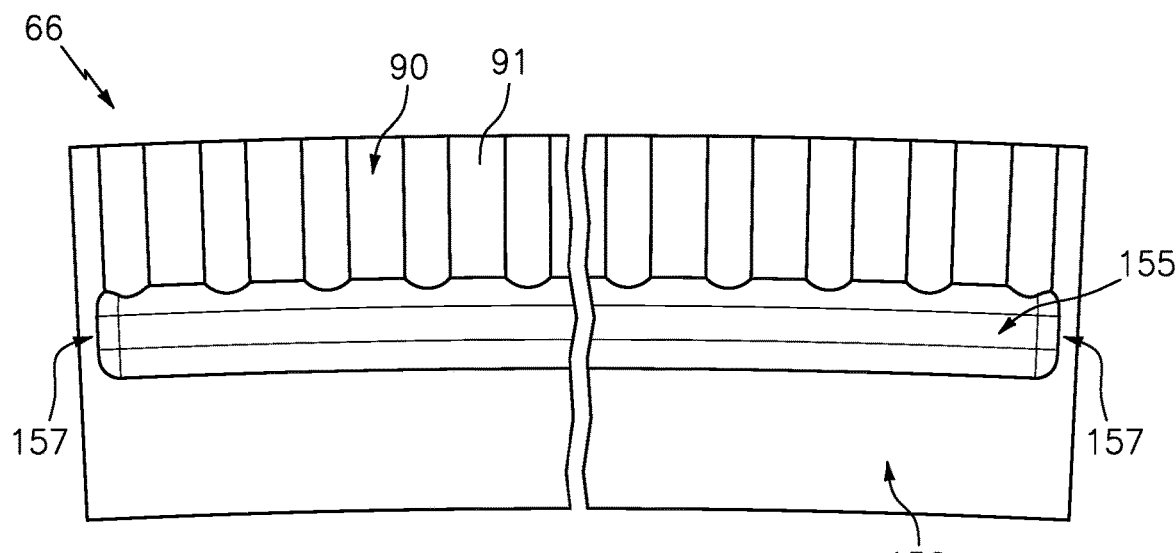
FIG. 13 is an inboard end view of the plate of FIG. 12.
Figure 15:
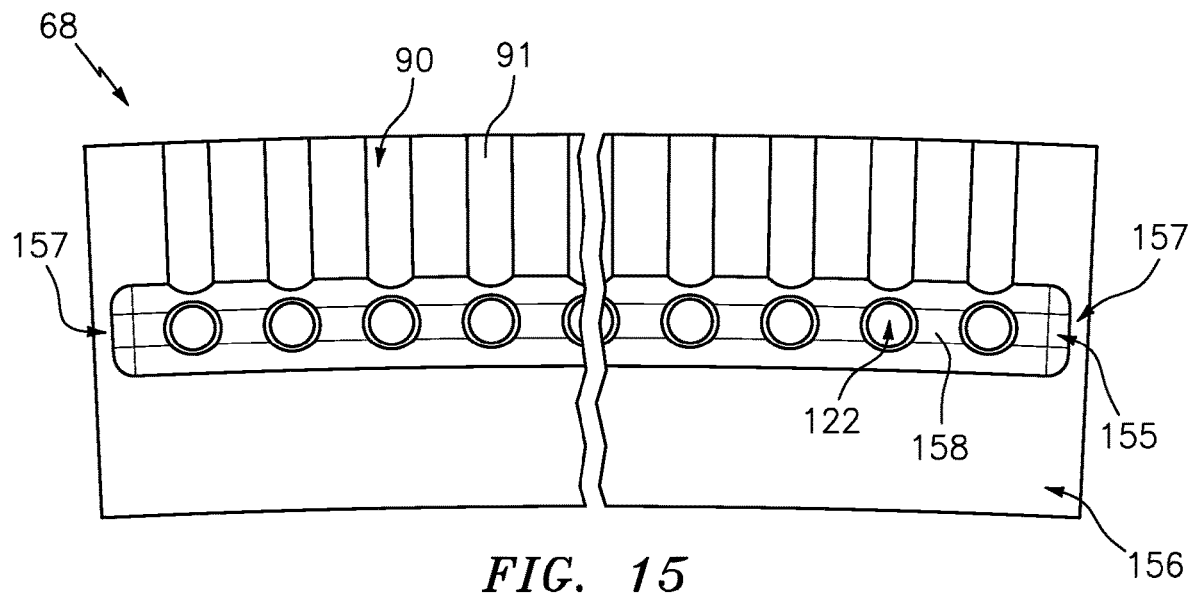
FIG. 15 is a first end view of a baffle plate in the ID manifold.
Figure 17:
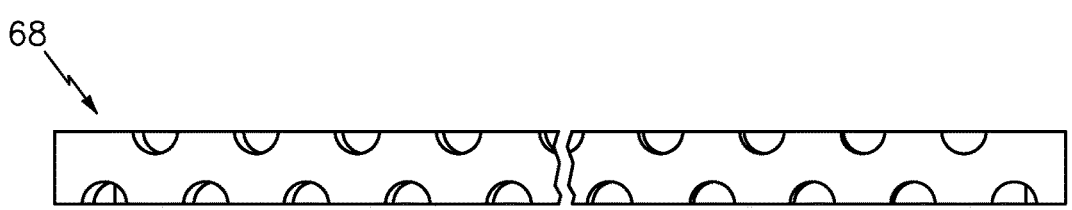
FIG. 17 is an off-center OD view of the plate of FIG. 17.
Figure 16:
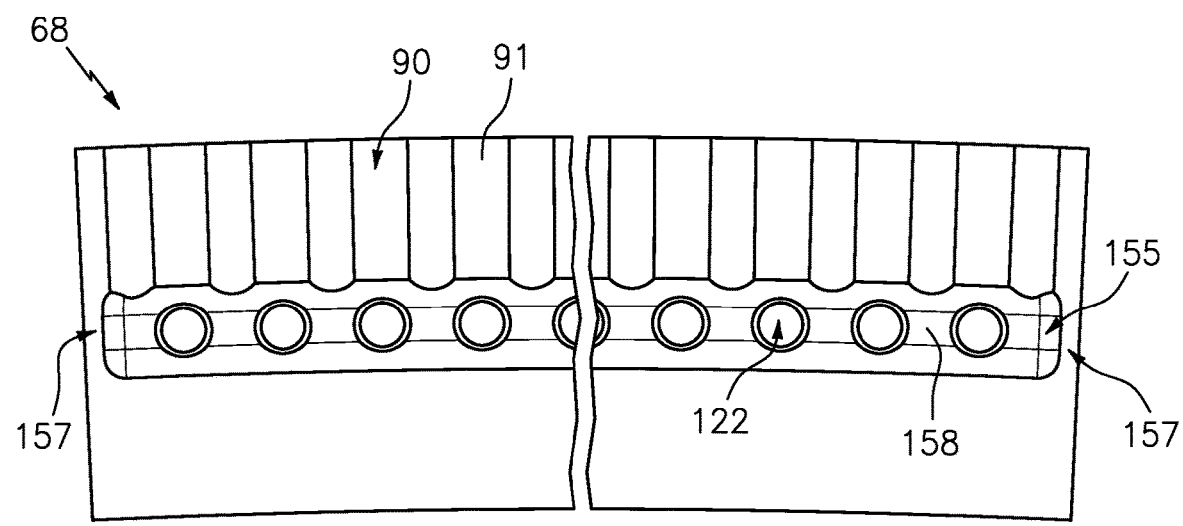
FIG. 16 is a second end view of the plate of FIG. 15.
Figure 18:
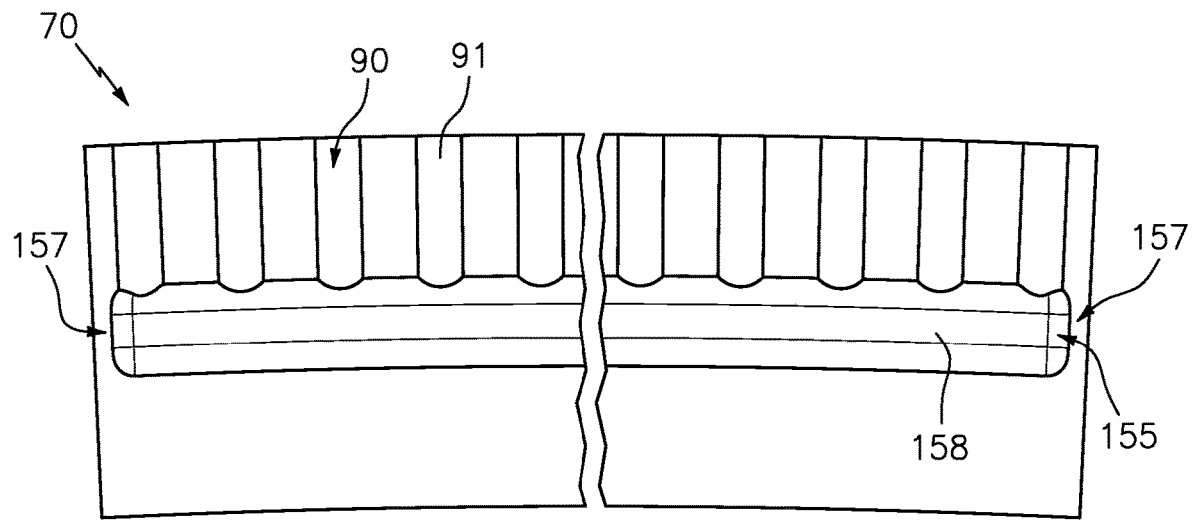
FIG. 18 is a first end view of a boundary plate in the ID manifold.
Figure 20:
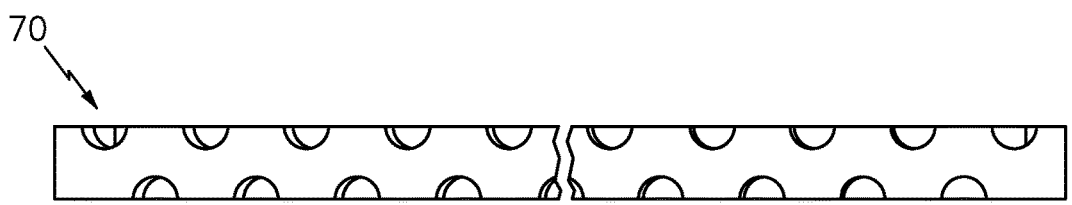
FIG. 20 is an off-center OD view of the plate of FIG. 18.

The ends of the tubes of each row are in respective communication with plenums formed between adjacent plates. FIG. 4 shows, from fore to aft, plenums 110, 112, 114, 116, 118, and 120 in the ID manifold 42 and 130, 132, 134, 136, 138, and 140 in the OD manifold 44. The various plenums are formed by channels in the mating axial faces of adjacent plates. In the exemplary embodiment, all but the axially outboard faces of the end plates have such channels. In the exemplary embodiment, with separate inlet manifold 26 and outlet manifold 28, the ID manifold aft plenum 120 and forward plenum 110 open radially inward (along the ID face of the ID manifold 42) so as to form an aft inlet slot 126 (FIG. 4) and a forward outlet slot 128. To form the forward plenum 110 and aft plenum 120 of the ID manifold, the associated plate faces have radially inwardly open circumferentially elongate channels 150 (FIG. 5) each having an open inboard radial end 151 and circumferential ends at circumferential end walls 152. The open inboard radial ends 151 of the mating pairs of plates form the associated ports 126 and 128. The remaining plate faces of the ID manifold have radially inwardly closed circumferentially elongate channels 155 (FIG. 10) having closed radially inboard ends along an intact ID wall 156 and closed circumferential ends at intact end walls 157. A web 158 of material is left between the channels of a given such plate. In the baffle plates, the web 158 is pierced by the ports 122 (FIG. 15).

Figure 21:
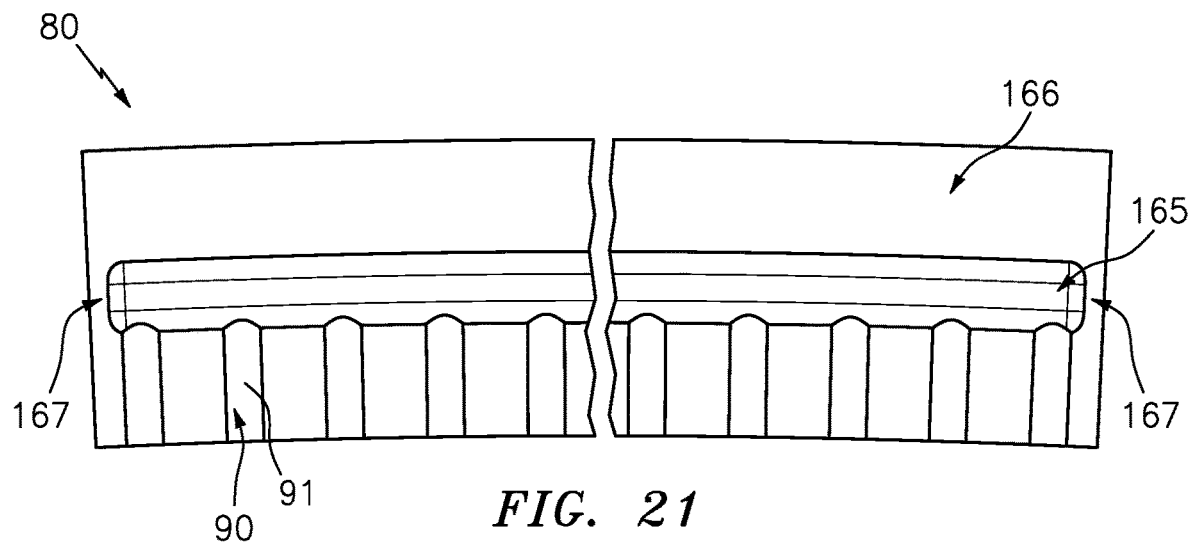
FIG. 21 is an inboard end view of a first end plate in an outer diameter (OD) manifold of the heat exchanger.
Figure 22:
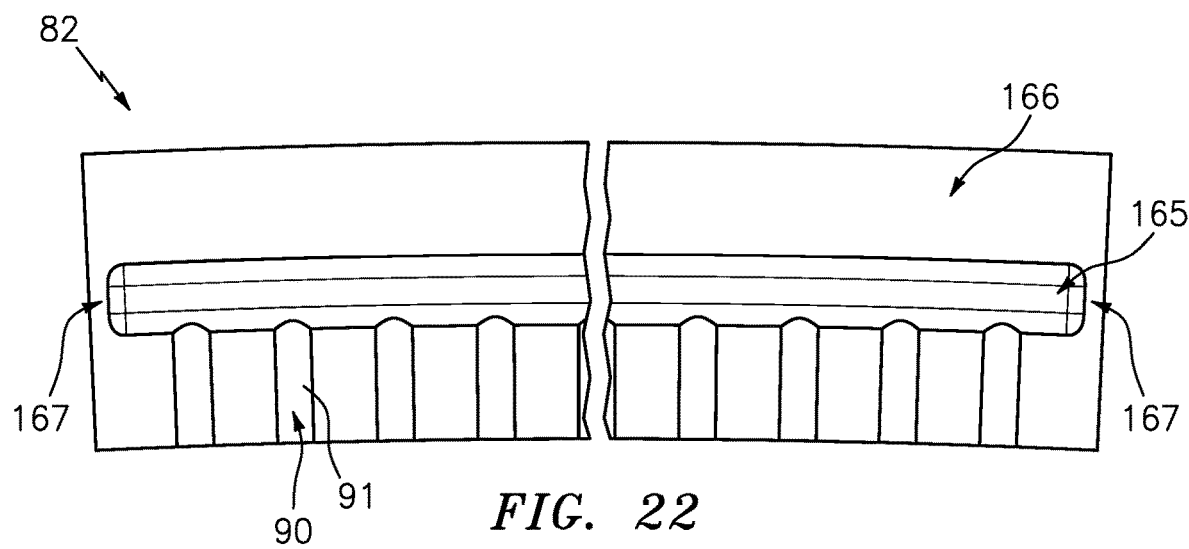
FIG. 22 is an inboard end view of a second end plate in the OD manifold.
Figure 23:
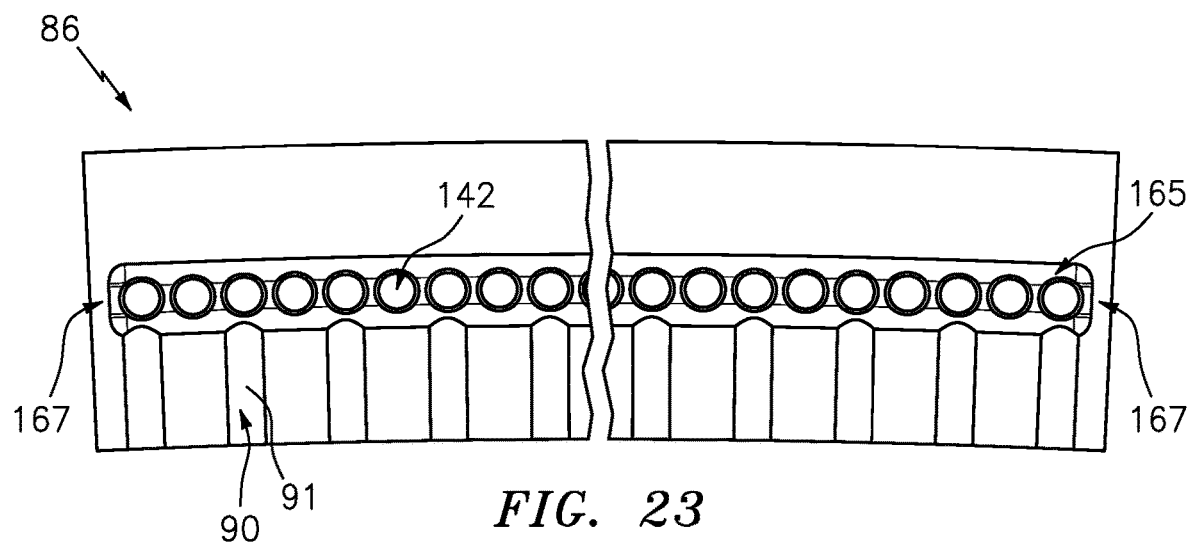
FIG. 23 is a first end view of a baffle plate in the OD manifold.
Figure 25:
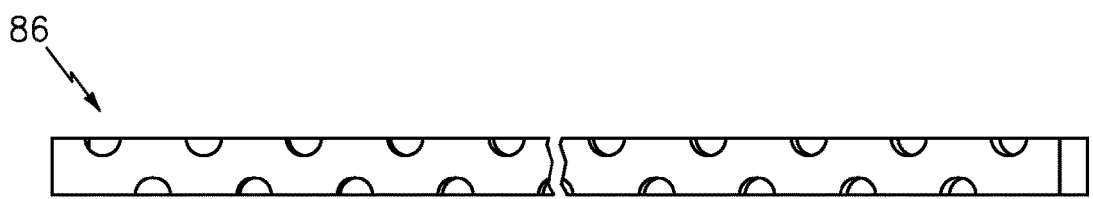
FIG. 25 is an off-center ID view of the plate of FIG. 23.
Figure 24:
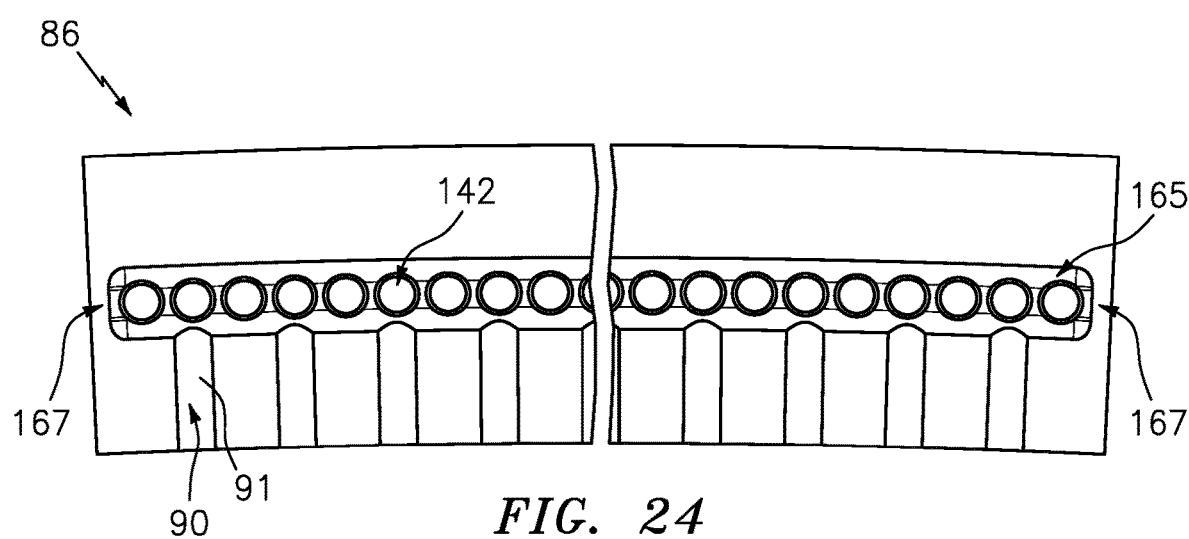
FIG. 24 is a second end view of the plate of FIG. 23.

In similar fashion to the respective mating pairs of channels 155 forming the FIG. 4 plenums 112, 114, 116, 118 of the ID manifold 42, the various axial faces of the OD manifold plates (except the front face of the first end plate 80 and aft face of the second end plate 82) have outwardly closed circumferentially elongate channels 165 (FIG. 21) forming the FIG. 4 plenums 130, 132, 134, 136, 138, 140. These channels 165 extend between circumferential ends at circumferential end walls 67 and have an outboard end at an intact outboard or outer diameter (OD) end wall portion 166.

The exemplary flow 910 (or a branch thereof) passes into the aft-most plenum 120 from the inlet 22. This flow branches into respective branches (or sub-branches) passing through the tubes of the last (aft-most) row of tubes to enter the aft-most OD plenum 140. The flow then passes forward through ports 142 in the plate 86 to enter the next forward OD plenum 138. The flow then re-branches to pass through the associated row of tubes to pass to the ID plenum 118. The flow then passes forward through ports 122 to the ID plenum 116 and, again re-branches to pass radially outward through the associated row of tubes, repeating the process until it passes to the forward-most ID plenum 110 and exits the outlet 24. This particular arrangement provides counter-flow (more particularly multi-pass, cross-counter flow) heat exchange between the two flows 910 and 920. Thus, the tube row that is upstreammost along the flowpath 900 is downstreammost along the flowpath 902 and so forth.

Each tube 46 (FIG. 29) extends between an opening at a first end or rim 200A and an opening at a second end or rim 200B. Proximate each end, the tube has a respective straight section or portion 202A, 202B of which a portion is received in the associated manifold socket 58.

Figure 29:
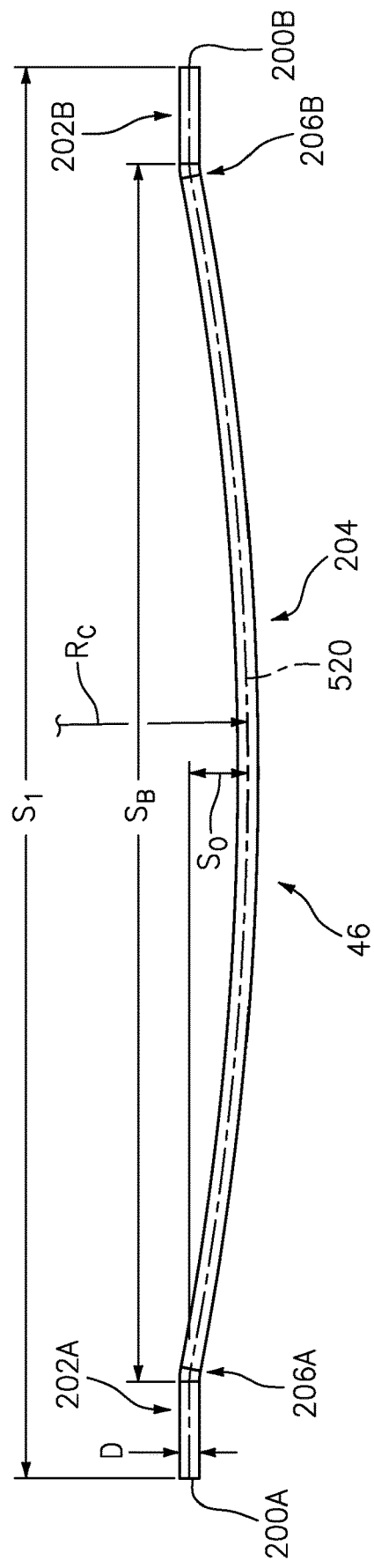
FIG. 29 is a side view of a tube in the heat exchanger.

The exemplary tube 46 has an arcuate center section 204 joining the sections 202A, 202B at respective bends 206A, 206B. Thus, in this example, there are three bends with the arcuate portion 204 forming an intermediate bend of opposite direction to the bends 206A, 206B. For each individual tube, FIG. 29 shows an overall end-to-end length, spacing, or span $S_1$, a span or spacing $S_B$ between the bends 206A, 206B, and a radius of curvature $R_C$ of the arcuate section 204. The arc of the arcuate section 204 offsets the centerline of the tube at the center of the arc by a spacing $S_O$ relative to the centerline at the ends 200A, 200B. Each tube has an inner or interior surface 220 (FIG. 4) and an outer or exterior surface 222 and has a centerline shown as 520. The arcuate section may represent a majority of the overall length along the tube centerline and a majority of the end-to-end direct length or span $S_1$ and a majority of the radial span $S_F$ (FIG. 3) between ID manifold OD surface and OD manifold ID surface.

Figure 2:
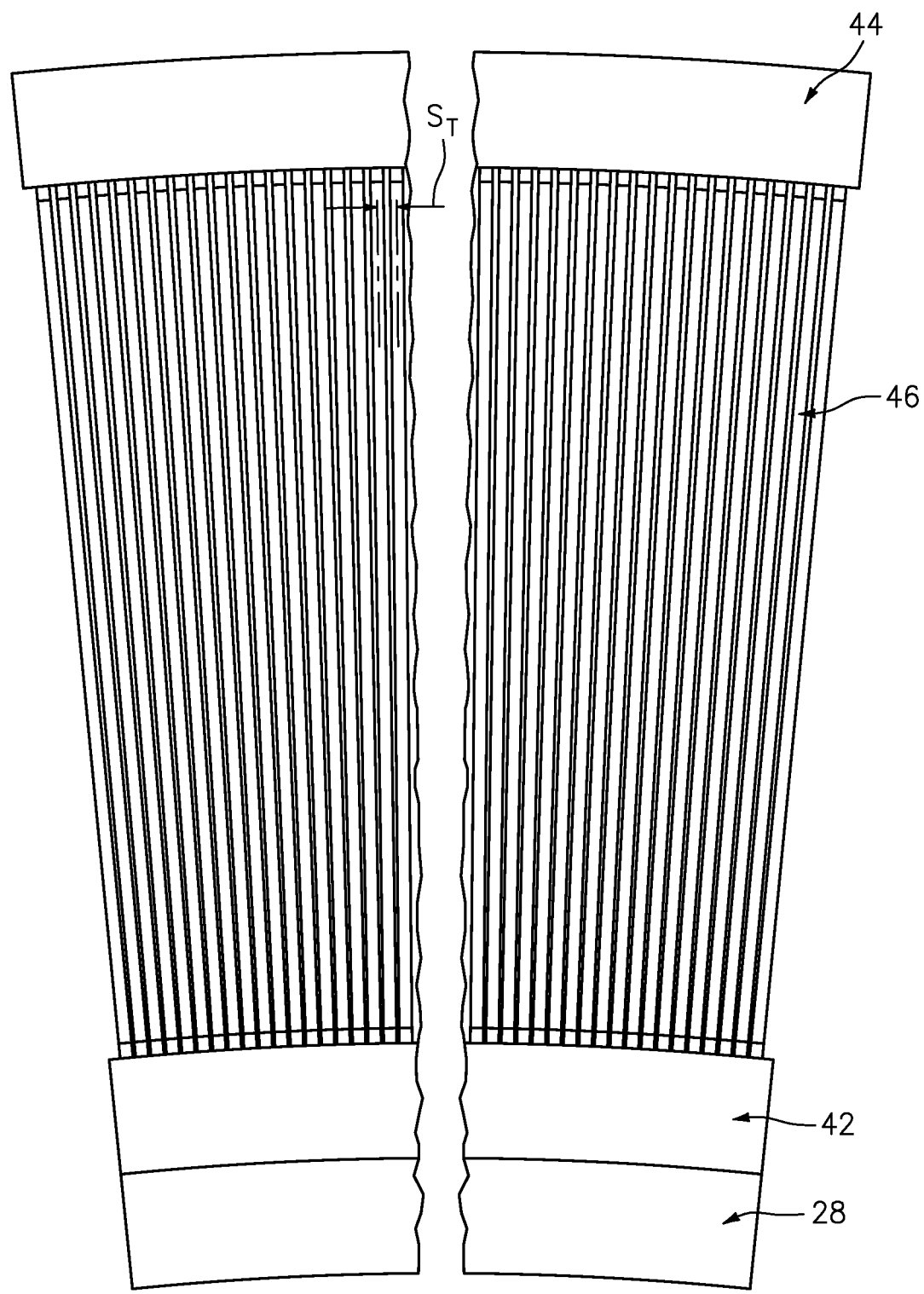
FIG. 2 is an end view of a segment of the heat exchanger.
Figure 19:
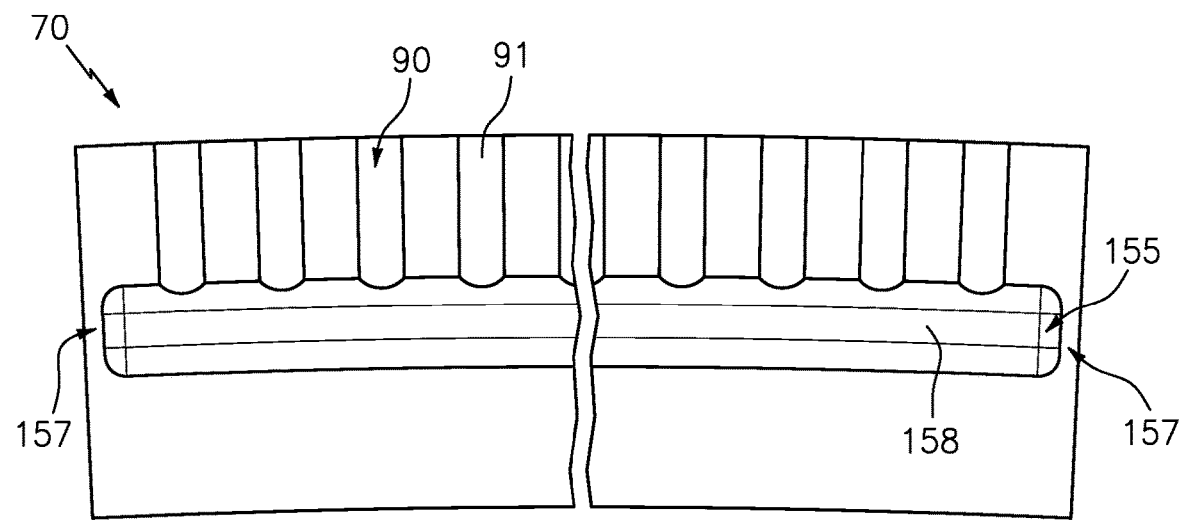
FIG. 19 is a second end view of the plate of FIG. 18.

FIG. 4 shows an on-center row-to-row axial spacing $S_L$ and FIG. 2 shows a circumferential on-center spacing within rows as $S_T$. FIG. 19 shows a tube outer diameter as D. With the radial fanning, $S_T$ may increase from the ID manifold to the OD manifold. Relaxed $S_O$ (e.g., all components isothermal at 21 C) may be greater than the row-to-row axial spacing $S_L$, for example it may be 1.0 to 5.0 times the row-to-row axial spacing $S_L$ (more narrowly 1.5 to 4.0 or 1.5 to 2.5). This provides an advantageous combination of mechanical stability while accommodating flexing. Too low an $S_O$ may cause excessive compressive stresses. Too high an $S_O$ may allow the first flow 910 to resonate the tubes and produce flutter. The flutter may produce hysteresis or, if out of phase, may cause tube collisions.

In an exemplary typical general use situation, the first fluid flow 910 is a relatively cool heat recipient flow and the second flow 912 is a relatively warm heat donor flow. In an initial transient startup situation, the relatively high thermal mass of the manifold structures (typically associated with greater material thickness) will typically mean that the second flow 912 heats the tubes (more particularly the exposed portions of the tubes) faster than it heats the manifolds. This will cause a differential thermal expansion of the tubes relative to the manifolds. Differential thermal expansion expands the tubes. The arcuate nature of the tubes allows the tubes to expand limiting stress. In the illustrated example, this will cause $S_O$ to increase (whereas a straight tube might suffer very high compressive stresses or might buckle unpredictably). Aerodynamic stability considerations suggest that the tubes be oriented to bend downstream along the first flowpath 900.

There may also be cool-down or other transient in the opposite direction. If the temperature of the second flow decreases (or the second flow is stopped), the exposed portions of the tubes may cool more rapidly than the manifolds and differentially thermally contract reducing $S_O$ potentially even beyond its initial pre-use value.

Alternatively, the first flow 910 may be the heat donor flow and the second flow 912 be the heat recipient flow. Unless, however, the second flow is cooled below ambient, the initial transient may still be in the same direction discussed above if the first flow heats the exposed portions of the tubes faster than the manifolds heat.

An exemplary specific use situation is in a recuperator or waste heat recovery wherein the first flow 910 is of the recuperator working fluid (e.g., carbon dioxide). The heat exchanger 20 may be used as a heat absorption heat exchanger in the hot section of the engine (e.g., absorbing heat from combustion gases (as the second flow 912) in an exhaust duct downstream of the turbine). Alternatively, the heat exchanger may be used as a heat rejection heat exchanger (e.g., rejecting heat to air (as the second flow 912) in a fan duct or other bypass).

Figure 30:
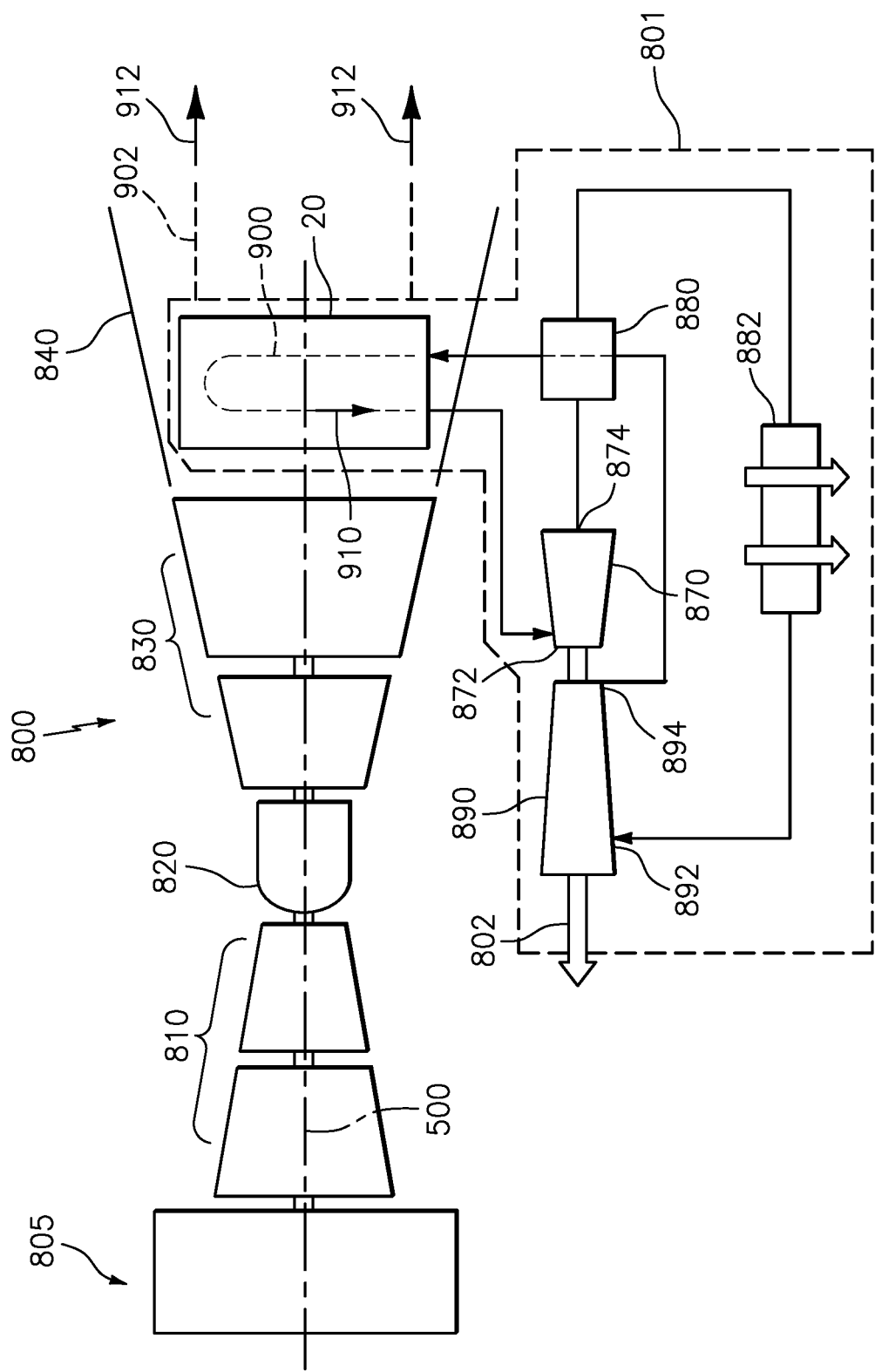
FIG. 30 is a schematic view of a gas turbine engine having the annular heat exchanger in a recuperating supercritical $CO_2$ bottoming cycle.

FIG. 30 schematically illustrates a gas turbine engine 800, including the heat exchanger 20 in a waste heat recovery system (recuperator) 801. The exemplary engine is an aircraft propulsion engine, namely a turbofan. The engine has a fan section 805, one or more compressor sections 810, a combustor section 820 and one or more turbine sections 830, sequentially along a primary fluid flowpath (core flowpath). The fan also drives air along an outboard bypass flowpath. The exemplary engine is a two-spool engine with the low spool directly or indirectly (e.g., via reduction gearbox) driving the fan. Exemplary combustors are annular combustors and can-type combustor arrays.

A downstream section of the core flowpath provides the second flowpath 902. Downstream of the turbine section 830 is an exhaust casing 840 which exhausts combustion gas (as the fluid flow 912) into an ambient atmosphere downstream of the turbine.

In order to recapture the waste heat from the combustion gas flow 912 and convert the waste heat to work, the heat exchanger 20 is positioned within the exhaust casing 840. The first flowpath 900 is a leg of a supercritical $CO_2$ ($sCO_2$) bottoming Brayton cycle (referred to herein as the waste heat recovery system 801). The heat exchanger 20 is connected to transfer heat from the turbine exhaust to the waste heat recovery system 801, and the waste heat recovery system 801 converts the heat into rotational work (which may be used for various purposes such as driving an electrical generator (not shown) to power aircraft systems). The waste heat recovery system 801 may additionally recuperate waste heat within the recovery system 801 and is referred to as a recuperating bottoming cycle.

The waste heat recovery system 801 has a turbine 870 with an inlet 872 connected to an output of the heat exchanger 20. The turbine 870 expands the heated working fluid ($CO_2$ or other cryogenic fluid 910) and expels the heated working fluid through a turbine outlet 874. The expelled working fluid is passed through a relatively hot passage of a recuperating heat exchanger 880, and is passed to a relatively hot passage of a heat rejection heat exchanger 882. The heat exchanger 882 may be positioned to reject thermal energy from the working fluid to ambient air (e.g., fan bypass air). After passing through the heat rejection heat exchanger 882, the working fluid is passed to an inlet 892 of a compressor 890. The compressor 890 (driven by the turbine 870 (e.g., co-spooled)) compresses the working fluid, and passes the compressed working fluid from a compressor outlet 894 to a cold passage of the recuperating heat exchanger 880.

During operation of the waste heat recovery system 801, the compressor 890 compresses the working fluid, and passes the compressed working fluid through the recuperating heat exchanger 880 and the heat exchanger 20, causing the compressed working fluid to be heated in each of the heat exchangers 20, 880. The heated working fluid is provided to the inlet 872 of the turbine 870 and expanded through the turbine 870, driving the turbine 870 to rotate. The rotation of the turbine 870 drives rotation of the compressor 890 and of an output shaft 802. The output shaft 802 may be mechanically connected to one, or more, additional turbine engine systems and provides work to those systems using any conventional means for transmitting rotational work. Additionally or alternatively, the rotational work can be converted into electricity and used to power one or more engine or aircraft systems using a conventional electrical generator system coupled to the output shaft.

Other variations on stacked manifolds are possible. Variation areas may have interdependencies. One area for variation is the manifold footprint. Several variations on manifold footprint are discussed above. For example, whereas the FIG. 1 embodiment forms the heat exchanger 40 as an annular sector for ease of manufacture and/or installation/service, full annulus variations are possible.

A related area for variation is the relative positioning of tubes in a row. For example, in contrast to the radial tubes between concentric inner and outer manifolds, there may be parallel tubes extending between two facing/parallel manifolds (e.g., a left and right manifold, an upper and lower manifold, or other absolute orientation or orientation relative to the overall engine or aircraft).

Other variations involve tube shape (e.g., bending). A variation on the continuously arcing central portion is to have a straight central portion offset from the end portions by short legs. Respective bends/turns separate the ends of the short legs from the straight central portion and the associated end portion. Differential thermal expansion can thus mostly lengthwise extend or contract the central portion and flex the bends. This has an advantage of relatively low upstream or downstream movement and prevents tube collision when there is a small axial spacing $S_L$ (particularly when the thermal expansion differs from row to row).

Other variations involve tube cross-section. The tube or a portion thereof along the external flowpath may be flattened (e.g., ovalized, ellipsoidalized or obroundized) such as by pressing or rolling to narrow transverse to the external flowpath and lengthen along the external flowpath. Such flattened tubes may provide aerodynamic stability and enhanced heat transfer.

Other variations involve differing internal flow arrangements. Whereas, in the first embodiment, each row of tubes represents a single fluidic stage, other configurations may differ. For example, alternating tubes in a given row may represent fluidically different stages along the internal flowpath. For example, the internal flowpath may enter a given tube in the row in one manifold, pass to an adjacent tube in that row in the other manifold, and then pass to a tube in the next row, and so forth. One advantage of such a system is that it facilitates use of completely identical intermediate plates rather than two alternating groups. Two groups of identical plates may be rotated by an increment about the axis relative to each other for annular plates or may be flipped front-to-back. In one group of examples, rather than full annular plenums being formed between the mating plates, one of the manifolds may have a circumferential array of two-port plenums.

Exemplary manufacture of manifold plates may be via casting and machining, via machining from billet or plate stock, via powder metallurgical consolidation, via additive manufacture, or the like. Exemplary tubes may be formed by extrusion or rolling followed by bending/cutting. Exemplary plates and tubes are metallic (e.g., nickel-based superalloy or stainless steel). In an exemplary manufacture technique, the plates are successively stacked starting with corresponding end plates of the two manifolds. In the stacking orientation, the pocket segments face upward and the tubes of the associated row/group are put in place. With the exemplary bent tubes, it is, thus, easiest to start with the downstreammost plates 62, 82 along the first flowpath 900 because gravity will keep the arcuate center portions of the tubes in their proper orientations. The next plate is then placed over the prior plate and the next row of tubes put in place until the stacks are complete. In some manufacture techniques, the pocket segments may be dimensioned to have a slight interference with the tubes to assure tight fit and sealing. In other manufacture techniques, the pocket segments may be dimensioned to have a slight clearance with the tubes for ease of assembly.

The stacking process may be used with any of a number of securing processes. One securing process (not shown) is to use through-bolts (e.g., nutted) extending through each stack and tightened down. In such a situation, there may be optional gaskets between plates in the stacks.

An alternative securing technique is brazing. In such a situation, braze foils or braze paste beads may be included in the stacks between the plates and at the tube-to plate junctions. After assembly, pressure may be applied across the stacks (e.g., via clamps) and the assembly heated (e.g., in a furnace) to braze the plates of each stack together.

An alternative securing process somewhat similar to the brazing is a welding process (sintering if the plates are formed powder metallurgically) in which pressure and electric current are applied across the stacks (optionally accompanied by additional heating beyond that provided by the pressure and current) to bond adjacent plates to each other and, optionally, to the tubes. A similar technology in sintering of powder-formed bodies is field assisted sintering technology (FAST), also known as spark plasma sintering.

The brazing and welding or sintering are particularly suited for the initial tube-to-plate (pocket) clearance fit mentioned above. When subject to the furnace heating, the low thermal mass of the tubes and conduction from the exposed portions of the tubes to the end portions differentially thermally expands the tubes from a clearance fit to an interference fit. Once interfering, the braze or welding/sintering process bonds and seals the tubes to the plates.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger comprising:
a first manifold assembly comprising a stack of plates;
a second manifold assembly comprising a stack of plates; and
a plurality of tubes extending from the first manifold assembly to the second manifold assembly,
wherein:
the plurality of tubes comprises a plurality of groups of tubes; and
for each of the groups of the tubes:
the tubes of the group have first ends mounted between plates of the first manifold assembly; and
the tubes of the group have second ends mounted between plates of the second manifold assembly;
the first manifold assembly is an inner manifold assembly; and
the second manifold assembly is an outer manifold assembly at least partially surrounding the inner manifold assembly so that the tubes of each group diverge from each other from the first manifold assembly to the second manifold assembly.

2. The heat exchanger of claim 1 wherein:
the plurality of groups form a respective plurality of stages of tubes, with the tubes of each group being fluidically in parallel with each other and the tubes of the different groups being fluidically in series.

3. The heat exchanger of claim 1 wherein:
adjacent plates of the first manifold assembly combine to form associated plenums common to the tubes of the associated group of tubes; and
adjacent plates of the second manifold assembly combine to form associated plenums common to the tubes of the associated group of tubes.

4. The heat exchanger of claim 1 wherein:
the groups form respective rows of tubes; and
the heat exchanger has at least 3 said rows of tubes.

5. The heat exchanger of claim 1 wherein:
the groups form respective rows of tubes; and
the heat exchanger has at least 20 tubes in each of the rows.

6. The heat exchanger of claim 1 wherein:
the tubes each have a plurality of bends.

7. The heat exchanger of claim 6 wherein:
the tubes' plurality of bends each have a respective bend axis transverse to a stacking direction of the first manifold assembly and second manifold assembly.

8. The heat exchanger of claim 7 wherein:
the tubes' at least one bend is, for each tube, a first bend and a second bend; and
between the first bend and the second bend, each tube has a continuous arc of at least 50% of a length of said tube.

9. The heat exchanger of claim 1 wherein:
in at least one of the first manifold assembly and the second manifold assembly:
the stack of plates comprises a first end plate, a second end plate, and a plurality of intermediate plates; and
the plurality of intermediate plates are:
a plurality of first intermediate plates identical to each other; and
one or more second intermediate plates identical to each other if more than one but different from the first intermediate plates and alternating with the first intermediate plates.

10. The heat exchanger of claim 1 wherein:
in the first manifold assembly:
the stack of plates comprises a first end plate, a second end plate, and a plurality of intermediate plates; and
the plurality of intermediate plates are an alternating plurality of first intermediate plates identical to each other and second intermediate plates identical to each other but different from the first intermediate plates; and
in the second manifold assembly:
the stack of plates comprises a first end plate, a second end plate, and a plurality of intermediate plates; and
the plurality of intermediate plates are an alternating plurality of first intermediate plates identical to each other and second intermediate plates identical to each other but different from the first intermediate plates.

11. The heat exchanger of claim 10 wherein:
in the first manifold assembly:
the first intermediate plates have a first face with a first channel, a second face with a second channel, and no through-holes between the first channel and second channel; and
the second intermediate plates have a first face with a first channel, a second face with a second channel, and a plurality of through-holes between the first channel and second channel; and
in the second manifold assembly:
the first intermediate plates have a first face with a first channel, a second face with a second channel, and a plurality of through-holes between the first channel and second channel; and
the second intermediate plates have a first face with a first channel, a second face with a second channel, and no through-holes between the first channel and second channel.

12. The heat exchanger of claim 1 wherein:
the manifold plates and tubes each comprise Ni-based superalloy or stainless steel.

13. A turbine engine including the heat exchanger of claim 1 and further comprising:
a gas path passing gas across exteriors of the plurality of tubes.

14. The turbine engine of claim 13 wherein:
the tubes each have a first bend and a second bend; and
between the first bend and the second bend, each tube has a portion of at least 50% of a length of said tube.

15. The turbine engine of claim 14 wherein:
the first bend and second bend shift said portion downstream along the gas path.

16. A method for using the heat exchanger of claim 1, the method comprising:
passing a first fluid flow along a first flowpath across exteriors of the tubes; and
passing a second fluid flow through interiors of the tubes
wherein:
the tubes each have at least one bend;
the at least one bend shifts a portion of the tube downstream along the first flowpath; and
the passing of the first flow and the second flow thermally expands the length of the tubes to further shift the portion downstream along the first flowpath.

17. A heat exchanger comprising:
a first manifold assembly comprising a stack of plates;
a second manifold assembly comprising a stack of plates; and
a plurality of tubes extending from the first manifold assembly to the second manifold assembly,
wherein:
the tubes each have a plurality of bends;
the plurality of tubes comprises a plurality of groups of tubes; and
for each of the groups of the tubes:
the tubes of the group have first ends mounted between plates of the first manifold assembly; and
the tubes of the group have second ends mounted between plates of the second manifold assembly.

18. The heat exchanger of claim 17 wherein:
the tubes each have a first said bend and a second said bend; and
between the first bend and the second bend, each tube has a portion of at least 50% of a length of said tube.

19. A turbine engine including the heat exchanger of claim 17 and further comprising:
a gas path passing gas across exteriors of the plurality of tubes.

20. The turbine engine of claim 19 wherein:
the first bend and second bend shift said portion downstream along the gas path.

21. A heat exchanger comprising:
a first manifold assembly comprising a stack of plates;
a second manifold assembly comprising a stack of plates; and
a plurality of tubes extending from the first manifold assembly to the second manifold assembly,
wherein:
the plurality of tubes comprises a plurality of groups of tubes;
for each of the groups of the tubes:
the tubes of the group have first ends mounted between plates of the first manifold assembly; and
the tubes of the group have second ends mounted between plates of the second manifold assembly; and
in at least one of the first manifold assembly and the second manifold assembly:
the stack of plates comprises a first end plate, a second end plate, and a plurality of intermediate plates; and
the plurality of intermediate plates are:
a plurality of first intermediate plates identical to each other; and
one or more second intermediate plates identical to each other if more than one but different from the first intermediate plates and alternating with the first intermediate plates.

* * * * *